Oct. 14, 1947.    L. POGLEIN    2,428,942
BAND AND HANDLE ASSEMBLY
Filed Feb. 21, 1945

INVENTOR
Louis Poglein
BY William B Jaspert
ATTORNEY

Patented Oct. 14, 1947

2,428,942

UNITED STATES PATENT OFFICE 2,428,942

BAND AND HANDLE ASSEMBLY

Louis Poglein, Jeannette, Pa., assignor to McKee Glass Company, Jeannette, Pa., a corporation of Pennsylvania Application February 21, 1945, Serial No. 579,051

2 Claims. (Cl. 294—27)

This invention relates to new and useful improvements in metal bands and handles for glassware or the like and it is among the objects thereof to provide a metal band and handle which are attachable to glass coffee makers or other glass vessels without the use of fastening screws, clips or other fastening means.

It is a further object of the invention to provide metal bands for attaching handles which are secured to a vessel by a snap action of the band in the end of the handle and which are detachable by the insertion of an implement in the handle member.

Another object of the invention is the provision of a metal band and handle for glass vessels or the like in which the act of assembling the band and handle places the band under sufficient tension for grippingly engaging the vessel to which it is attached.

Figure 1:
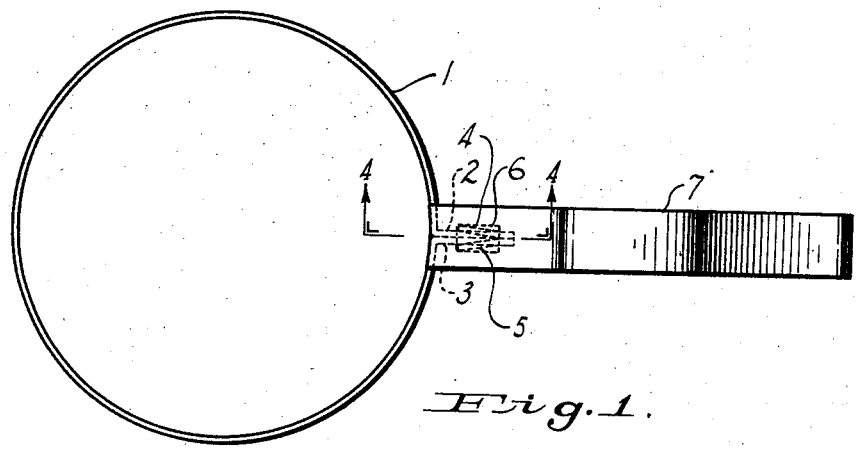
Figure 2:
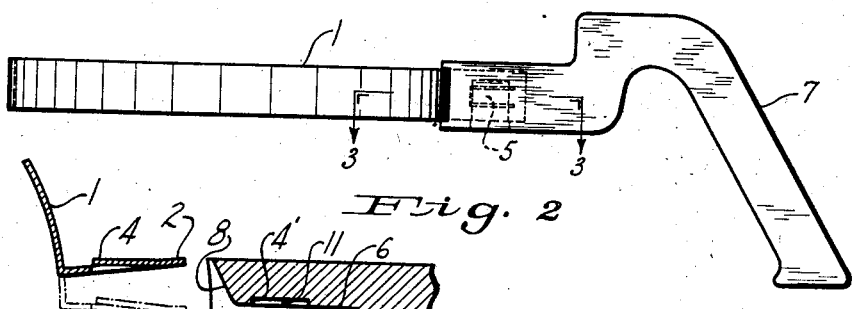
Figure 3:
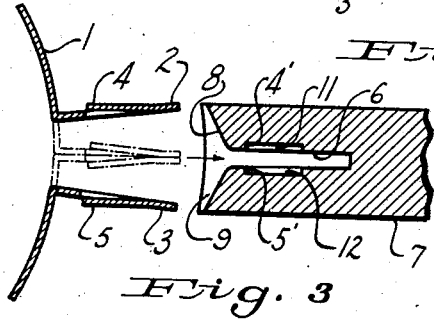
Figure 4:
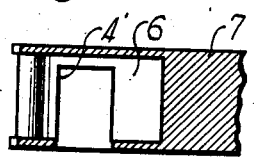
Figure 5:
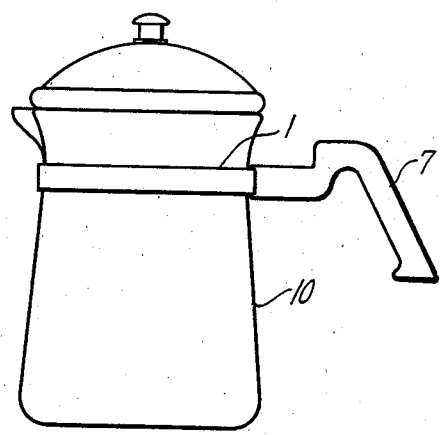

These and other objects of the invention will become more apparent from a consideration of the accompanying drawing constituting a part hereof, in which like reference characters designate like parts and in which, Fig. 1 is a top plan view of a metal band and handle member embodying the principles of this invention;

Fig. 2 a side elevational view thereof;

Fig. 3 an exploded view of a portion of the band and handle member taken along the line 3—3, Fig. 2;

Fig. 4 a partial cross section of the handle member taken along the line 4—4, Fig. 1; and Fig. 5 a side elevational view diagrammatically showing the attachment of the handle member to a glass coffee maker.

With reference to the several figures of the drawing, the numeral 1 designates a metal band having turned over ends 2 and 3, Fig. 3, with upstruck portions 4 and 5 of a width as shown in Fig. 2. The band 1 is of a metal of sufficient stiffness to constitute the upstruck portions 4 and 5 spring members for engagement with shoulders 4' and 5' in the recess or slot 6 of the handle 7. The end of the handle has a curved face 8 somewhat complementary in shape to the curvature of the band 1 and recessed at 9 to a depth corresponding to the thickness of the band 1 so that the end of the handle is flush with the band when assembled thereon. As shown in Fig. 3, the band has been placed around the body of the vessel designated by the numeral 10, Fig. 5. The ends 2 and 3 are then brought together as shown in the dotted lines and are inserted in the recess 6. When the upstruck portions 4 and 5 pass the shoulders 4', 5', they will spring against the shoulder and interlock the band with the handle. As the ends 2 and 3 move into the recess 6 they are drawn to nearly contacting engagement to apply a tension on the band for correspondingly engaging the wall of the vessel 10 or any other container to which they may be attached. The receiving slot 6 of the handle is provided with recesses 11 and 12 to allow the upstruck portions 4 and 5 to spring outward for engaging the shoulders 4', 5'.

While the interlock of the band ends and handle securely hold them in assembled position by interaction of the spring elements of the band with the handle recesses, they may be dismembered by inserting a flat strip into the recesses 11 and 12 to depress the upstruck spring elements 4 and 5 for the purpose of withdrawing the band ends 2 and 3 from the recess 6 of the handle. Thus while the construction of the band and handle provides for the speedy assembly of the handle to a vessel without the use of screws or other fastening means, the design also provides an expedient means for dismembering the same.

Although one embodiment of the invention has been herein illustrated and described, it will be evident to those skilled in the art that various modifications may be made without departing from the principles herein set forth.

I claim:

1. In a handle mount for glassware or the like, a split band having parallel terminal ends extending radially outward therefrom, said ends having upstruck portions on their face, a handle having a socket end shaped to receive said terminals and having shoulders on the wall of said socket portion for interacting with the upstruck portions of the terminals, said handle socket being flared to apply tension on the band to grippingly engage a glass container or the like as the terminals pass into the handle socket and said handle having a slot transversely of the socket for receiving implements to displace the band terminals for releasing the handle.

2. In a handle mount for glassware or the like, a split band having terminal ends extending radially outward therefrom, said ends having upstruck portions constituting spring interlocks, a handle member having a socket shaped to receive the terminal ends with shoulders in the socket wall for interacting with the terminal spring members, and said handle having a slot extending transversely to the socket portion for receiving implements to displace the terminal springs for releasing said handle member.

LOUIS POGLEIN.

REFERENCES CITED

The following references are of record in the file of this patent:

UNITED STATES PATENTS

| Number | Name | Date |
| --- | --- | --- |
| 1,022,978 | Stevenson | Apr. 9, 1912 |
| 1,064,206 | Gould | June 10, 1913 |
| 2,136,644 | Steiner | Nov. 15, 1938 |
| 2,305,492 | Poglein | Dec. 15, 1942 |

FOREIGN PATENTS

| Number | Country | Date |
| --- | --- | --- |
| 2,033 | Great Britain | Apr. 29, 1882 |